US007978691B1

(12) United States Patent
Cole

(10) Patent No.: US 7,978,691 B1
(45) Date of Patent: Jul. 12, 2011

(54) CONNECTIVITY MANAGER WITH LOCATION SERVICES

(75) Inventor: Terry L. Cole, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 992 days.

(21) Appl. No.: 11/843,765

(22) Filed: Aug. 23, 2007

(51) Int. Cl.
*H04L 12/56* (2006.01)
*H04J 1/16* (2006.01)

(52) U.S. Cl. ......... 370/386; 370/252; 370/254; 370/328

(58) Field of Classification Search .................. 370/252, 370/254, 328, 386
See application file for complete search history.

(56) References Cited

U.S. PATENT DOCUMENTS

| 2008/0049626 A1* | 2/2008 | Bugenhagen et al. ........ 370/241 |
| 2008/0081580 A1* | 4/2008 | Cole .......................... 455/187.1 |

* cited by examiner

*Primary Examiner* — John Pezzlo
(74) *Attorney, Agent, or Firm* — Hamilton & Terrile, LLP; Gary W. Hamilton

(57) ABSTRACT

A system and method are disclosed for managing the connectivity of a mobile device to a plurality of network connectivity locations. A mobile device comprising a network connectivity manager accesses a repository of predetermined network connectivity management information stored on a network host. The network connectivity manager uses a first predetermined subset of the information to discover the presence of a first network and then manages connectivity between the mobile device and the first discovered network. A second predetermined subset of information is then used to discover the presence of a second network. The network connectivity manager then transfers the mobile device's connectivity from the first network to the second network. Transfer of connectivity is dependent upon successful submission and acceptance of predetermined user credentials and each network's compliance with predetermined connectivity policies.

46 Claims, 7 Drawing Sheets

CONNECTIVITY MANAGER WITH LOCATION SERVICES

BACKGROUND OF THE INVENTION

1. Field of the Invention

Embodiments of the invention relate generally to information processing and communication systems. More specifically, embodiments of the invention provide a system and method for managing the connectivity of a mobile device to a plurality of network connectivity locations.

2. Description of the Related Art

Advances in microprocessor design and manufacturing have led to the evolution of powerful computing platforms with small form factors, modest power consumption, and low heat dissipation. These platforms have been adopted for use in a wide variety of mobile devices that include cell phones, smartphones, personal digital assistants (PDAs), tablet PCs, and laptop computers. It is now becoming common for these devices to concurrently support multiple types of physical and wireless connectivity. For example, a universal serial bus (USB) port may be provided for direct physical connection to other devices along with a Bluetooth or Ultra-Wideband (UWB) transceiver for wireless connections to a variety of peripherals. Similarly, an Ethernet port may be provided for physical connection to a local area network (LAN) in conjunction with a wireless modem to access wireless local area networks (WLANs), such as those based on variations of the IEEE 802.11 specification, often referred to as WiFi.

However, each of these connectivity options has attendant limitations. For example, USB is limited by its cable length restrictions and its comparatively slow throughput. Bluetooth and UWB don't require a physical connection, but they share similar distance and throughput limitations. An Ethernet LAN connection can deliver high throughput, but the device must be physically connected to the network, which limits mobility. Current WLANs provide both mobility and ongoing improvements in bandwidth, but their range is typically limited, the quality of their coverage may be erratic, and their presence may not be detectable if their broadcast beacon is disabled. While WWANs can provide greater geographical coverage, their use generally comes at the expense of lower bandwidth, higher cost, and unpredictable local availability. Furthermore, none of these provide the wide coverage, high bandwidth, ubiquity of access, and security desired by today's mobile device users. As a result, mobile device users are often required to connect, disconnect, and reconnect as they traverse from one area of network coverage to another. In some cases, the network coverage may be homogenous to the degree that the same communications protocol and bandwidth is available, such as for WiFi connections in the mobile device user's home, at a coffee shop, in an airport, or at their office. More often, network connectivity is likely to be heterogeneous, such as when a mobile device uses a DSL connection at home, a WWAN EDGE connection in the field, a WiFi connection in a retail venue, and an Ethernet LAN connection in their office. Further complications are caused by overlapping network coverage, as it may be difficult to determine which network connectivity will deliver the highest QOS at the lowest cost. Current approaches to these issues include network roaming solutions that detect the presence of wireless networks, discover the protocol they use, determine their area of coverage, and then transfer network connectivity according to predetermined parameters. In some approaches, these network connectivity transfers are automatic and transparent while others require varying degrees of user interaction.

However, the presence of physical or wireless network coverage may be neither apparent nor detectable, leading the mobile device user to mistakenly believe that network connectivity is unavailable. Approaches to this issue include databases that cross-reference network addresses to physical locations. Yet these databases are generally not linked to on-line mapping services or geographical positioning system (GPS) devices, and if stored on the mobile device, the information they contain may be dated or inconclusive. Furthermore, they may not provide the option for the user to manually enter network connectivity information which is then used to automatically update a master location database. Additional challenges are introduced by the need for mobile device users to comply with corporate connectivity and security policies. In some cases, these policies require establishing a virtual private network (VPN) connection in addition to provision of a user ID and password. In other cases, the use of cryptographic mechanisms is required, including digital certificates, smart cards, and tokens. Complying with these policies and managing multiple user credentials across a multitude of private and public networks can be tedious, error-prone, and time consuming. While it would be advantageous for a mobile device user to be able to address all of these issues with a single solution, this ability does not currently exist.

SUMMARY OF THE INVENTION

A system and method are disclosed for managing the connectivity of a mobile device to a plurality of network connectivity locations. In various embodiments of the invention, a mobile device comprising a network connectivity manager accesses a repository of network connectivity management information. The repository of network connectivity management information comprises predetermined network location information, network connectivity information, network connectivity policies, and mobile device user credentials. In one embodiment, the repository of network connectivity management information is stored on a network host and receives network connectivity management information from a plurality of sources. In another embodiment, the network host receives network connectivity management information collected by the network connectivity manager.

In different embodiments, the network connectivity manager uses a first predetermined subset of the network connectivity management information to discover the presence of a first network. The network connectivity manager then manages connectivity between the mobile device and the first discovered network. A second predetermined subset of the network connectivity management information is then used by the network connectivity manager to discover the presence of a second network. The network connectivity manager then manages the transfer of the mobile device's connectivity from the first network to the second network.

In one embodiment, the network connectivity manager discovers the presence of a wireless network by detecting a wireless network signal and then autonomously transfers the connectivity of the mobile device from the first network to the second network. In another embodiment, subsets of the network connectivity management information are used by the network connectivity manager to autonomously transfer the connectivity of the mobile device from the first network to the second network. In various embodiments, transfer of connectivity from the first network to the second network is dependent upon each network's compliance with predetermined connectivity policies. In other embodiments, connectivity to a predetermined network is dependent upon successful submission and acceptance of predetermined user credentials provided by the network connectivity manager.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method are disclosed for managing the connectivity of a mobile device to a plurality of network connectivity locations. In various embodiments of the invention, a mobile device comprising a network connectivity manager accesses a repository of predetermined network location information, network connectivity information, network connectivity policies, and mobile device user credentials. In one embodiment, the repository of network connectivity management information is stored on a network host and receives network connectivity management information from a plurality of sources. In another embodiment, the network host receives network connectivity management information collected by the network connectivity manager.

In different embodiments, the network connectivity manager uses a first predetermined subset of the network connectivity management information to discover the presence of a first network. The network connectivity manager then manages connectivity between the mobile device and the first discovered network. A second predetermined subset of the network connectivity management information is then used by the network connectivity manager to discover the presence of a second network. The network connectivity manager then manages the transfer of the mobile device's connectivity from the first network to the second network. In various embodiments, transfer of connectivity from the first network to the second network is dependent upon successful submission and acceptance of predetermined user credentials and each network's compliance with predetermined connectivity policies.

Figure 1:
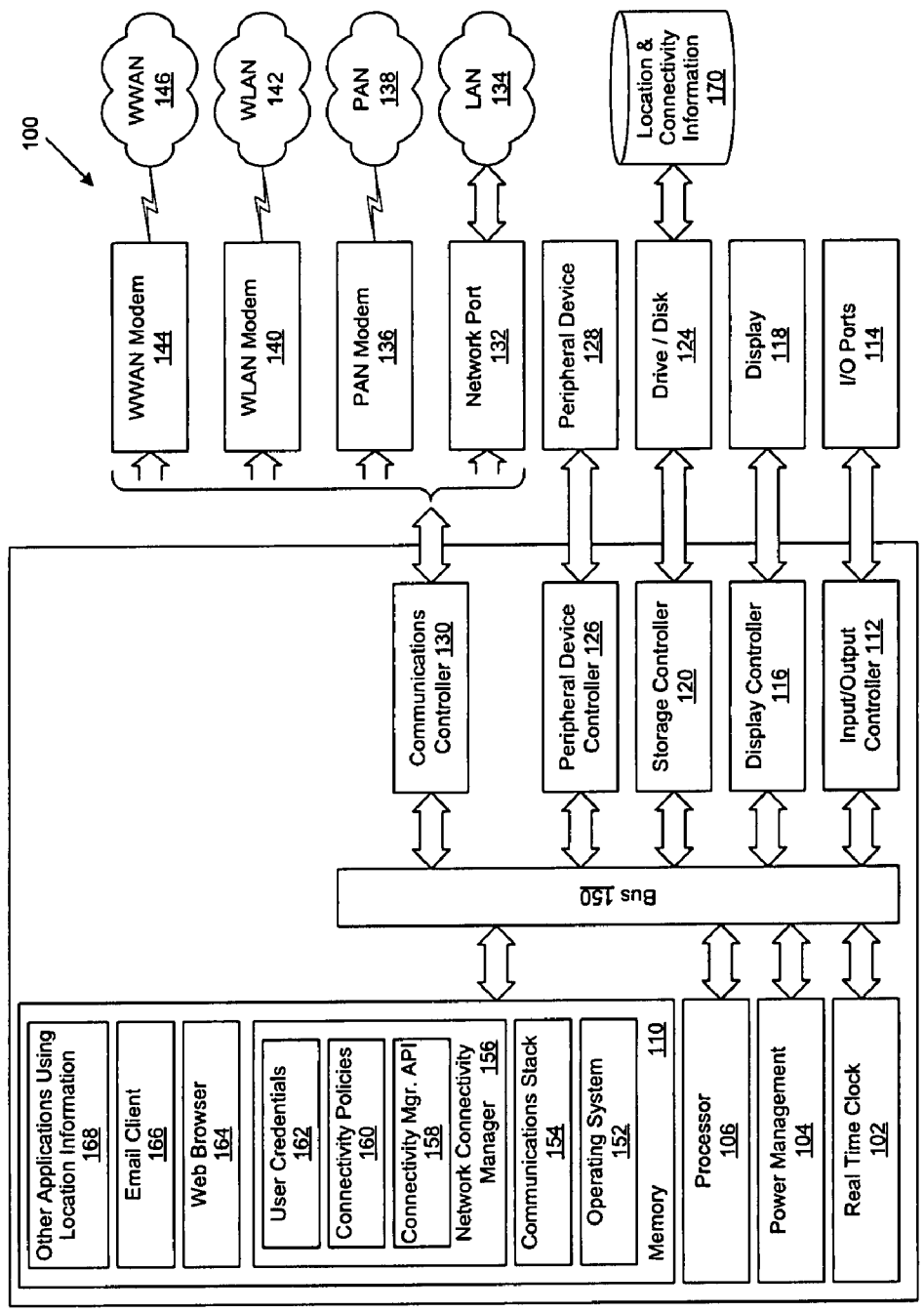
FIG. 1 is a generalized block diagram illustrating an information processing system 100 as implemented in accordance with an embodiment of the invention.

FIG. 1 is a generalized block diagram illustrating an information processing system 100 as implemented in accordance with an embodiment of the invention. System 100 comprises a real-time clock 102, a power management module 104, a processor 106 and memory 110, all physically coupled via bus 140. In different embodiments, memory 110 comprises operating system 152, communications stack 154, and network connectivity manager 156. Network connectivity manager 156 further comprises a network connectivity application program interface (API) 158, connectivity policies 160, and user credentials 162. Memory 110 also comprises web browser 164, email client 166, and other applications using network location information 168. In various embodiments, API 158 allows the network connectivity manager 156 to uniformly provide network location and connectivity information to the web browser 164, email client 166, and other applications using network location information 168.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. In different embodiments of the invention, hard disk 124 further comprises network location and connectivity information 170. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132. In turn, network port 132 further couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless personal area network (PAN) modem 136. In turn, PAN modem 136 further couples the information processing system 100 to one or more wireless PAN networks 138. In one embodiment, wireless PAN network 138 is based on technologies such as Bluetooth or Ultra Wideband (UWB). In another embodiment, communications controller 130 is coupled to wireless local area network (WLAN) modem 140. In turn, WLAN modem 140 further couples the information processing system 100 to one or more WLANs 142, such as those based on variations of the IEEE 802.11 specification, often referred to as WiFi. In yet another embodiment, communications controller 130 is coupled to wireless wide area network (WWAN) modem 144. In turn, WWAN modem 144 further couples the information processing system 100 to one or more WWANs 146, such as those based on an industry standard including two and a half generation (2.5G) wireless technologies such as general packet radio service (GPRS) and enhanced data rates for GSM evolution (EDGE). In other embodiments, WWAN network 146 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
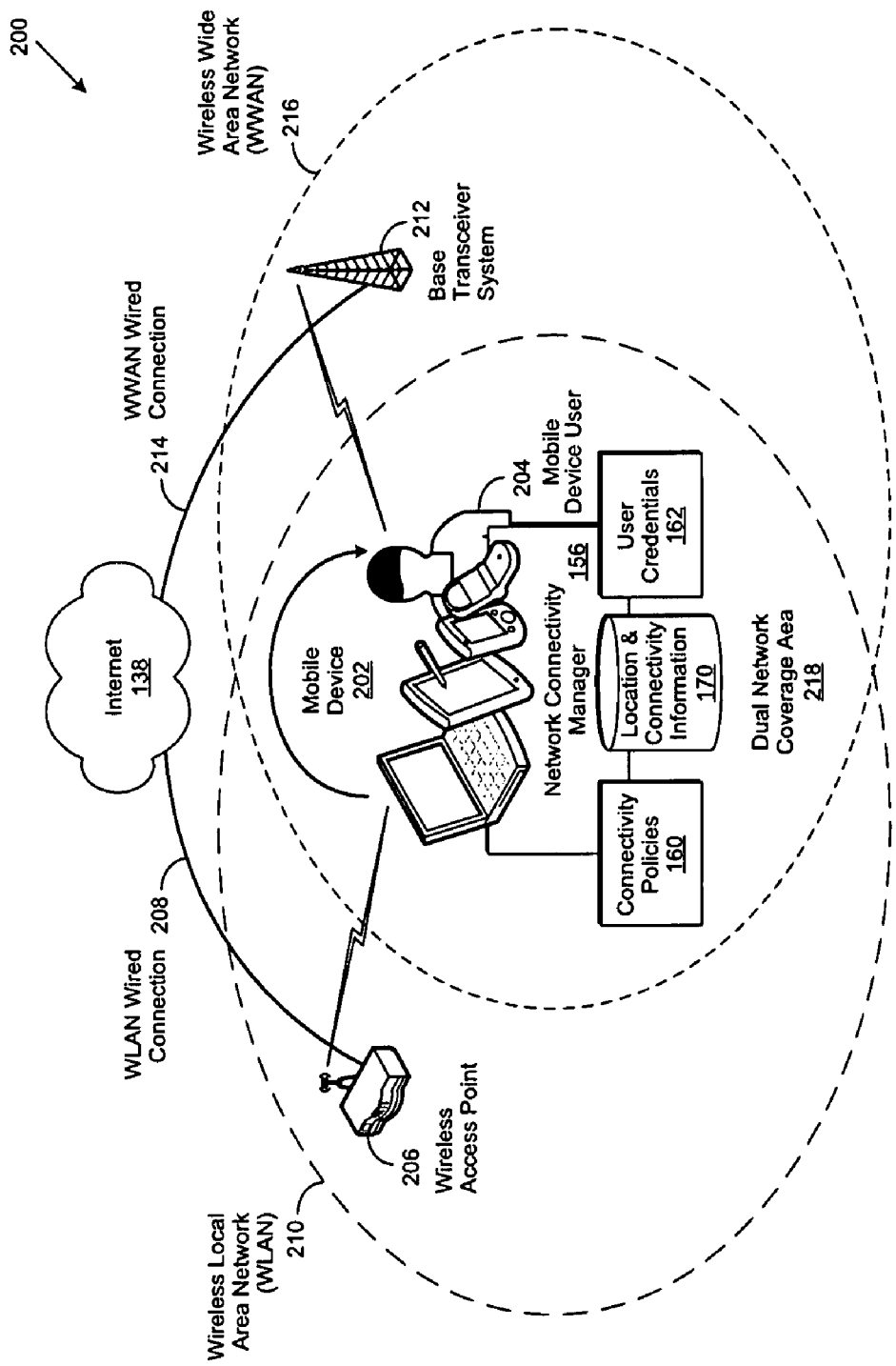
FIG. 2 is a simplified block diagram of an embodiment of the invention as implemented to manage the connectivity of a mobile device to a plurality of wireless networks.

FIG. 2 is a simplified block diagram of an embodiment of the invention as implemented to manage the connectivity 200 of a mobile device 202 to a plurality of wireless networks 210, 216. In this embodiment, wireless wide area network (WWAN) 216 comprises a plurality of inter-coupled base transceiver systems 212, one or more of which is coupled to the Internet 138 by a wired connection 214. Wireless local area network (WLAN) 210 similarly comprises one or more wireless access points 206, one or more of which is likewise connected via wired connection 208 to the Internet 138. Wireless device 202 comprises a network connectivity manager 156, further comprising connectivity policies 160, network location and connectivity information 170, and user credentials 162. Mobile device 202 also comprises a plurality of wireless modems, each of which is operable to provide connectivity with a predetermined type of wireless network (e.g., IEEE 802.11 WLAN, EDGE WWAN, etc). As each wireless modem senses the availability of the network protocol it supports, it is operable to establish and maintain an optimal network connection until connectivity is no longer available.

Network connectivity manager 156 monitors the operational status of each wireless modem to determine which type of network connectivity is available. Using predetermined criteria and operational parameters, the network connectivity manager 156 can control the wireless modems to establish an optimal connection, and then maintain that connection while connectivity is available. For example, a mobile device user 204 is in their office and the network connectivity manager determines that the WLAN modem detects the presence of office WLAN 210. The network connectivity manager 156 manages the operation of the WLAN modem to establish initial connectivity with the office WLAN 210, which requires user authentication as a security measure. The network connectivity manager 156 retrieves the appropriate user credentials 162, which are then submitted to the office WLAN 210. Once the user credentials 162 are submitted and accepted by WLAN 210, the network connectivity manager 156 establishes and maintains a compliant and optimal network connection.

The mobile device user 204 then decides to leave their office to go to a field site. The network connectivity manager 156 continues to maintain its connectivity with the mobile device user's office WLAN 210 as the mobile device user 204 is in transit to the field site. While in transit, the WWAN modem detects the presence of WWAN 216 while the mobile device user 204 continues to be within the coverage limits of the office WLAN 210.

Once sensed, the WWAN modem notifies the network connectivity manager 156 that WWAN connectivity has become available in the dual network coverage area 218. The network connectivity manager 156 references its location and connectivity information 170, connectivity policies 160 and user credentials 162 and confirms that the mobile device 202 is able to connect to the WWAN 216 and that mobile device user 204 is authorized for connectivity. The network connectivity manager 156 continues to monitor the connectivity status of the mobile device 202 to WLAN 210. As the mobile device user leaves dual network coverage area 218, connectivity to WLAN 210 is no longer optimal. As a result, the network connectivity manager 156 manages the WWAN modem to similarly establish and maintain an optimal connection to the WWAN 216. In one embodiment, the network connectivity manager 156 automatically and transparently transfers connectivity from WLAN 210 to WWAN 216. In another embodiment, the network connectivity manager 156 notifies the mobile device user 204 of loss of connectivity to WLAN 210 and the availability of connectivity to WWAN 216. Once notified, the mobile device user is responsible to manually connect to WWAN 216.

Figure 3:
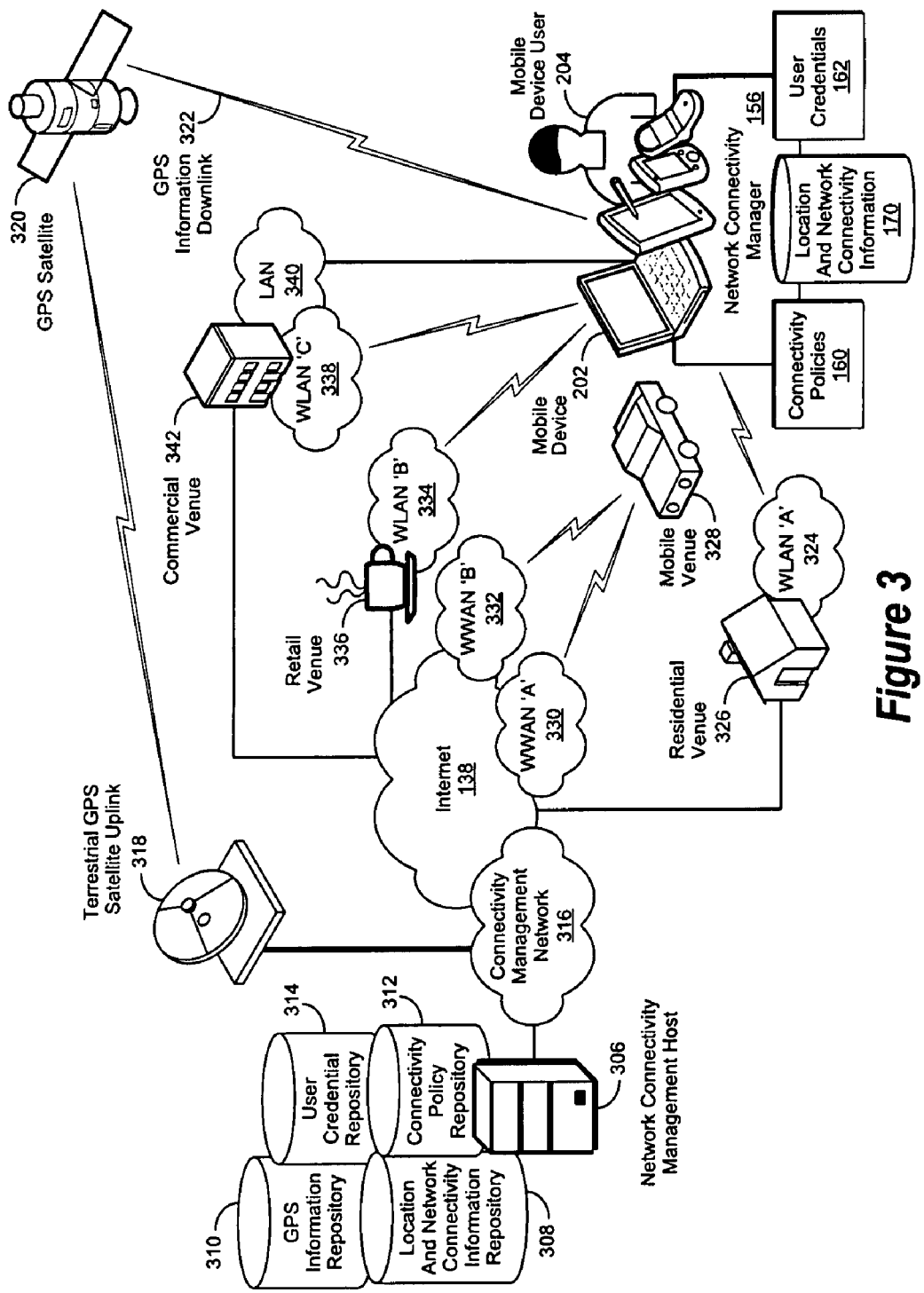
FIG. 3 is a simplified block diagram of a network connectivity manager as implemented in accordance with an embodiment of the invention.
Figure 4A:
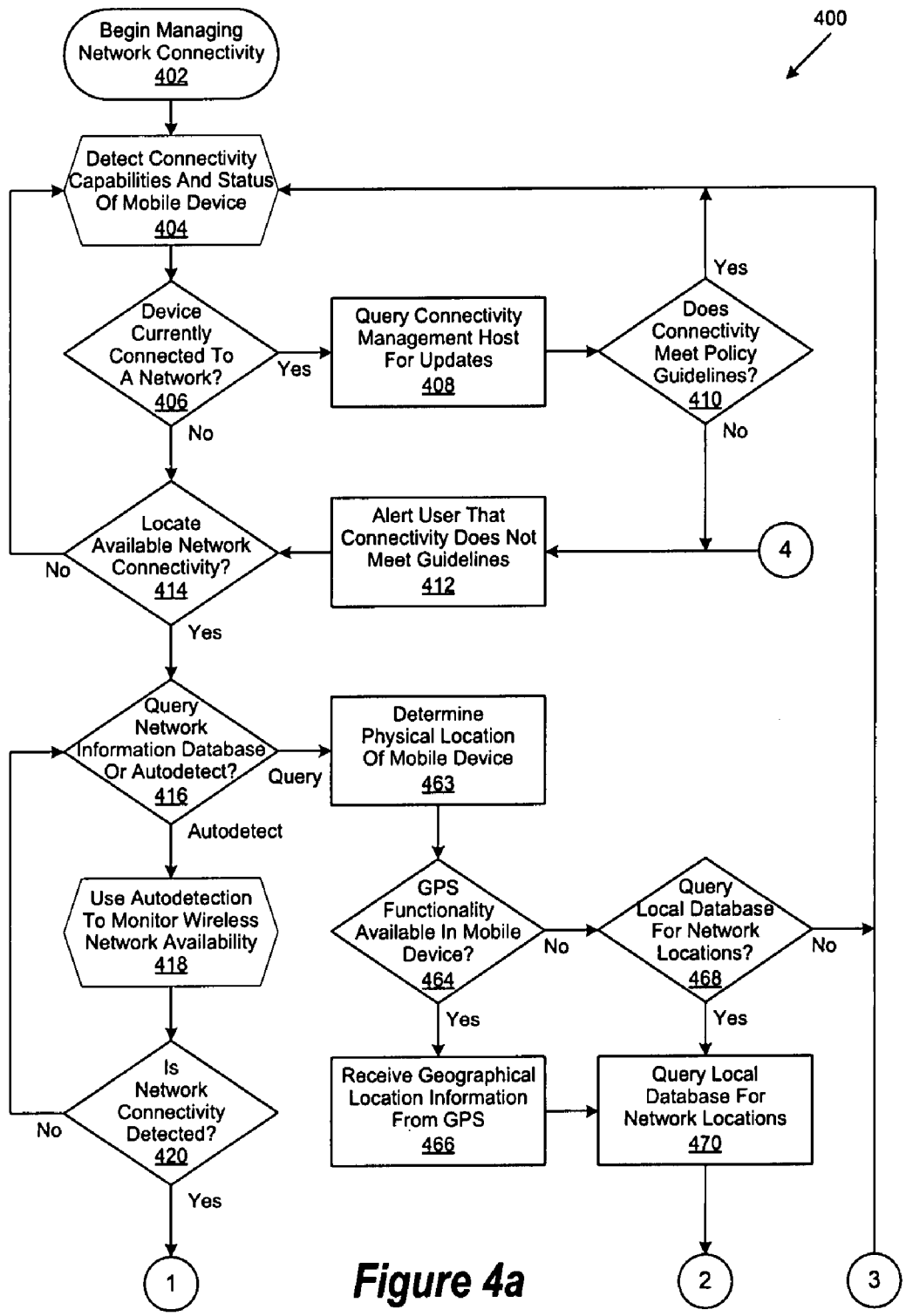
FIGS. 4a-d are a generalized flow chart illustrating a network connectivity manager as implemented in accordance with an embodiment of the invention.
Figure 4B:
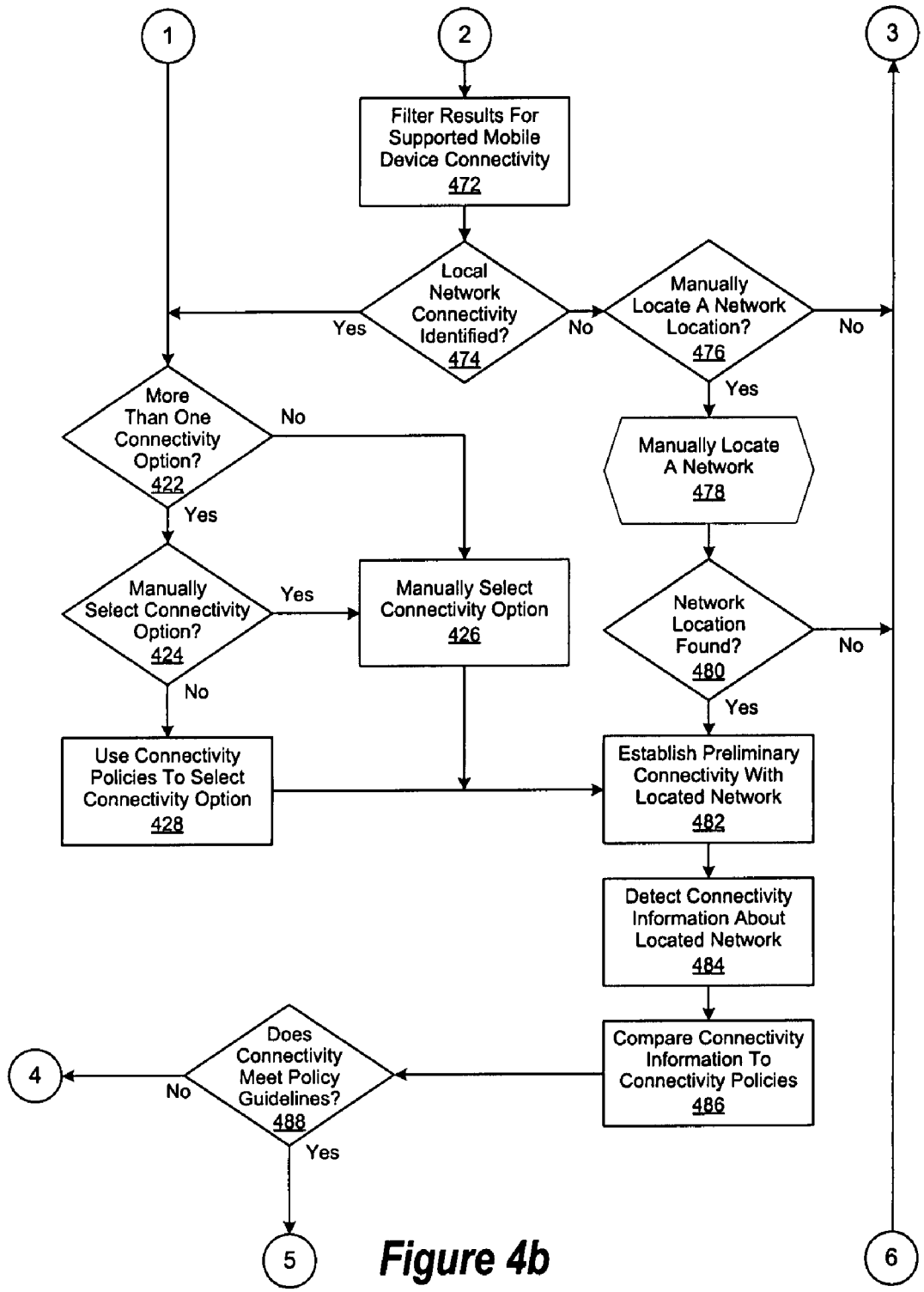
Figure 4C:
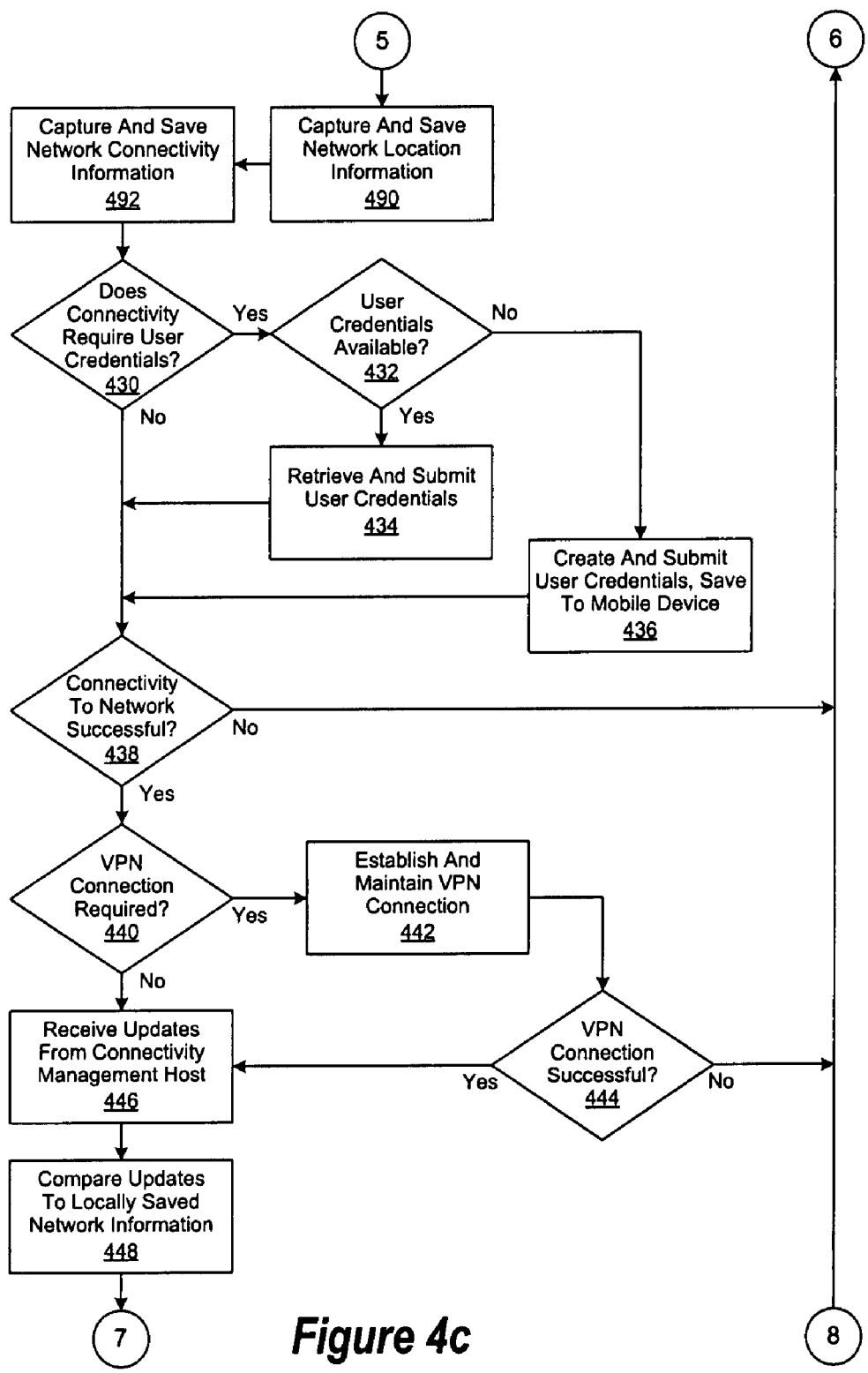
Figure 4D:
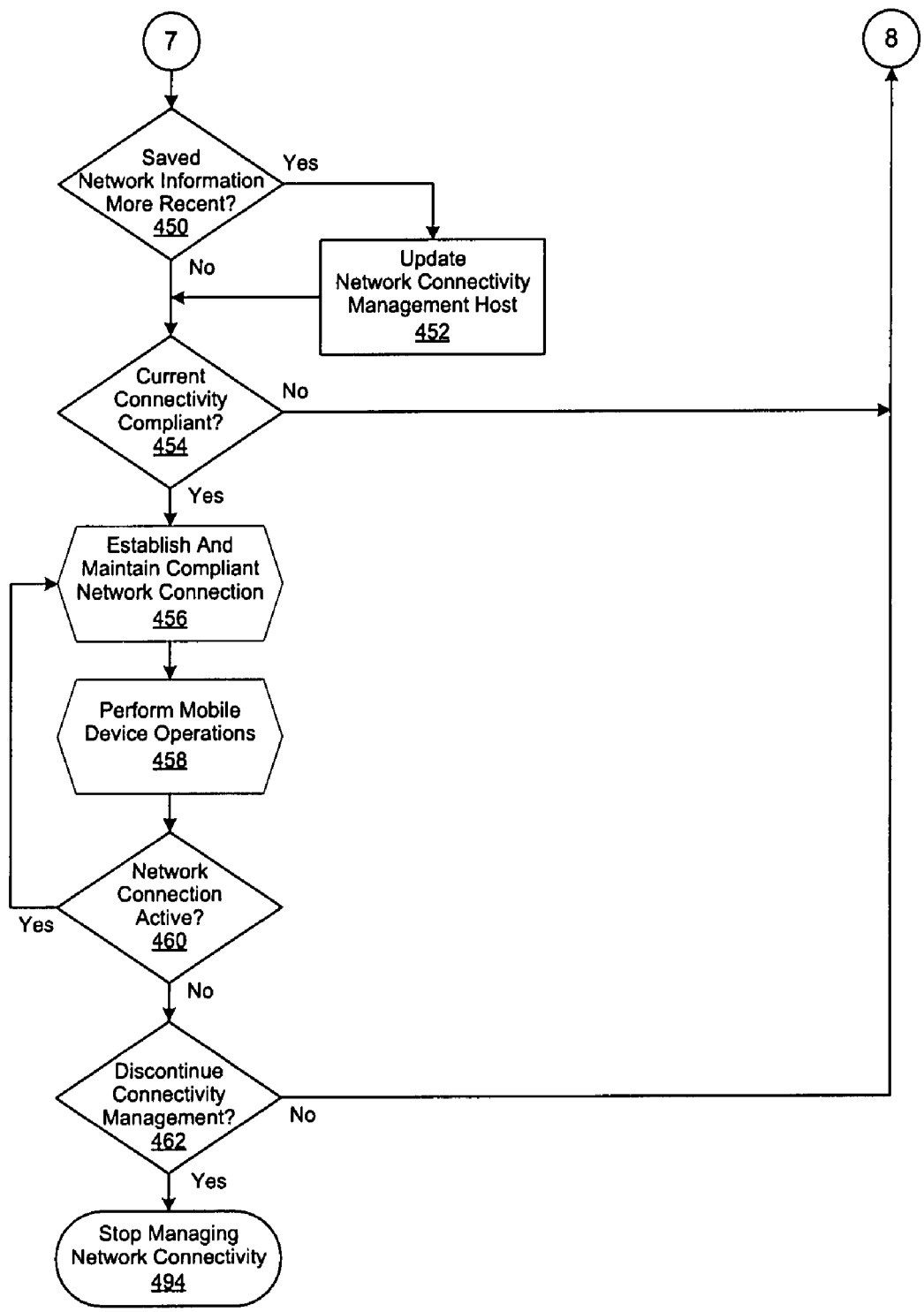

FIG. 3 is a simplified block diagram of a network connectivity manager as implemented in accordance with an embodiment of the invention. In various embodiments, wireless device 202 comprises a network connectivity manager 156, further comprising connectivity policies 160, network location and connectivity information 170, and user credentials 162. Mobile device 202 also comprises a plurality of wireless modems, each of which is operable to provide connectivity with a predetermined type of wireless network (e.g., IEEE 802.11 WLAN, EDGE WWAN, etc). As each wireless modem senses the availability of the network protocol it supports, it is operable to establish and maintain an optimal network connection until connectivity is no longer available.

In one embodiment, mobile device user 204 operates mobile device 202 within a plurality of usage venues including residential venue 326, mobile venue 328, retail venue 336, and commercial venue 342. As the mobile device user 204 transits from one usage venue to another, the network connectivity manager 156 monitors the operational status of each wireless modem to determine which type of network connectivity is available. Using predetermined criteria and operational parameters, the network connectivity manager 156 can control the wireless modems to establish an optimal connection, and then maintain that connection while connectivity is available. As an example, mobile device user 204 uses mobile device 202 to connect to the Internet 138 by establishing network connectivity through wireless local area network (WLAN) 'A' 324, which provides network connectivity for residential usage venue 326. The mobile device user 204 then leaves residential usage venue 326 and travels by automobile, which serves as a mobile usage venue 328. As the mobile device user 204 leaves residential usage venue 326, connectivity with WLAN 'A' 324 is lost.

While in transit, a WWAN modem implemented within mobile device 202 detects the presence of wireless wide area network (WWAN) 'A' 330. In different embodiments, WWAN 'A' 330 is based on an industry standard including two and a half generation (2.5G) wireless technologies such as general packet radio service (GPRS) and enhanced data rates for GSM evolution (EDGE). In still other embodiments, WWAN 266 is based on existing third generation (3G) wireless technologies including universal mobile telecommunications system (UMTS) and wideband code division multiple access (W-CDMA). In yet other embodiments, WWAN 266 is based on the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Once sensed, the WWAN modem notifies the network connectivity manager 156 that WWAN connectivity has become available through WWAN 'A' 330. In response, the network connectivity manager 156 references its location and connectivity information 170, connectivity policies 160 and user credentials 162 to determine the connectivity eligibility of WWAN 'A' 330. After performing predetermined comparison operations, the network connectivity manager 156 determines that while the mobile device 202 is able to connect to the WWAN 330, the mobile device user 204 is not authorized for connectivity. As a result, the network connectivity manager 156 continues to monitor the operational status of the WWAN modem implemented within mobile device 202.

As the mobile device user 204 continues in transit, the WWAN modem detects the presence of wireless wide area network (WWAN) 'B' 332. Once sensed, the WWAN modem notifies the network connectivity manager 156 that WWAN connectivity has become available through WWAN 'B' 332. In response, the network connectivity manager 156 references its location and connectivity information 170, connectivity policies 160 and user credentials 162 to determine the connectivity eligibility of WWAN 'A' 330. After performing predetermined comparison operations, the network connectivity manager 156 confirms that the mobile device 202 is able to connect to the WWAN 330 and that the mobile device user 204 is authorized for connectivity.

As a result, the network connectivity manager 156 manages the operation of the WWAN modem to establish initial connectivity with WWAN 'B' 332, which requires user authentication as a security measure. The network connectivity manager 156 retrieves the appropriate user credentials 162, which are then submitted to WWAN 'B' 332. Once the user credentials 162 are submitted and accepted by WWAN 'B' 332, the network connectivity manager 156 establishes and maintains a compliant and optimal network connection. In one embodiment, the network connectivity manager 156 automatically and transparently establishes connectivity with WWAN 'B' 332. In another embodiment, the network connectivity manager 156 notifies the mobile device user 204 of the availability of connectivity to WWAN 'B' 332. Once notified, the mobile device user is responsible to manually connect to WWAN 'B' 332.

While continuing in transit, the mobile device user 204 leaves the network coverage area of WWAN 'B' 332 and connectivity is no longer optimal. Concurrently, the WLAN modem implemented within the mobile device 202 detects broadcast beacon frames being transmitted from WLAN 'B' 334 located at retail usage venue 336. Once sensed, the WLAN modem notifies the network connectivity manager 156 that WLAN connectivity has become available, but its exact physical location is not yet known. In response, the network connectivity manager 156 samples the broadcast beacon frames being transmitted from WLAN 'B' 334 at predetermined intervals. Triangulation algorithms and operations known to those of skill in the art are then applied to the samples to direct the mobile device user 204 to the physical location of WLAN 'B' 334.

The network connectivity manager 156 then references its location and connectivity information 170, connectivity policies 160 and user credentials 162 to determine the connectivity eligibility of WLAN 'B' 334. After performing predetermined comparison operations, the network connectivity manager 156 confirms that the mobile device 202 is able to connect to the WLAN 'B' 334 and that the mobile device user 204 is authorized for connectivity. In one embodiment, the network connectivity manager 156 automatically and transparently transfers connectivity from WWAN 'B' 332 to WLAN 'B' 334. In another embodiment, the network connectivity manager 156 notifies the mobile device user 204 of the loss of connectivity to WWAN 'B' 332 and the availability of connectivity to WLAN 'B' 334. Once notified, the mobile device user is responsible to manually connect to WLAN 'B' 334.

Upon leaving retail usage venue 336, the mobile device user exceeds the network coverage area of WLAN 'B' 334 and WLAN connectivity is lost. The wireless modems implemented within the mobile device 202 continue network auto-detection operations but fail to sense the presence of a wireless network before the mobile device user arrives at commercial usage venue 342. In one embodiment, the mobile device 202 comprises geographical positioning system (GPS) capabilities that the network connectivity manager 156 can access to assist in manually locating network connectivity. Using the GPS capabilities of mobile device 202, the network connectivity manager 156 receives GPS information from the GPS information repository 310. The GPS information is retrieved from the GPS information repository 310 by the network connectivity management host 306 and communicated through connectivity management network 316 to terrestrial GPS satellite uplink 318. The terrestrial GPS satellite uplink 318 then broadcasts the GPS information to GPS satellite 320 where it is delivered to mobile device 202 via GPS information downlink 322.

The network connectivity manager 156 then uses the GPS information to establish the geographical location of the mobile device 202. Based on the geographical location of the mobile device, candidate network location information is then retrieved by the network connectivity manager from a local network location database. In one embodiment, the network location database is contained within the location and connectivity information 170 of mobile device 202. In another embodiment, the network location database is stored external to the mobile device 202 and is accessed through a separate connection, such as through a USB or Bluetooth connection. The candidate network location information is then filtered by the network connectivity manager 156 to eliminate network connectivity options that the mobile device 202 cannot support. Once the network location information has been filtered, the network connectivity manager 156 determines the location of WLAN 'C' 338, which has its detection beacon disabled. The network connectivity manager 156 then uses location and connectivity information 170, connectivity policies 160, and user credentials 162 to determine whether mobile device 202 is able to connect to WLAN 'C" 338 and if mobile user 204 is authorized for connectivity. In yet another embodiment, GPS information is used with location services provided by a third generation (3G) wireless network to determine the location of the mobile device and network connectivity locations.

In a different embodiment, the mobile device 202 does not comprise GPS capabilities and queries a network location database contained within the location and connectivity information 170 of mobile device 202. In yet another embodiment, the network location database is stored external to the mobile device 202 and is accessed through a separate connection, such as through a USB or Bluetooth connection. The candidate network location information is then filtered by the network connectivity manager 156 to eliminate network connectivity options that the mobile device 202 cannot support. Once the network location information has been filtered, the network connectivity manager 156 determines the location of WLAN 'C' 338, which has its detection beacon disabled. The network connectivity manager 156 then uses location and connectivity information 170, connectivity policies 160, and user credentials 162 to determine whether mobile device 202 is able to connect to WLAN 'C" 338 and if mobile user 204 is authorized for connectivity.

In another embodiment, the mobile device 202 does not comprise GPS capabilities and querying a network location database fails to identify the location of network connectivity in the vicinity of commercial usage venue 342. As a result, mobile device user 204 attempts to locate a network connectivity location using manual methods. In one embodiment, the mobile device user makes inquiries of other users regarding network access. In another embodiment, the mobile device user calls a help desk to locate possible network connectivity. Many such embodiments are possible and the examples given herein are merely exemplary and are not meant to be construed as definitive.

As a result of the mobile device user's 204 manual network connectivity location methods, network connectivity to local area network (LAN) 340 is located. After location, a preliminary network connection is established to the LAN 340 by the network connectivity manager 156. Once the preliminary network connection is established, the network connectivity manager 156 detects and collects network connectivity information about the LAN 340. Comparison operations are then performed on the collected network connectivity information to determine whether connectivity to the LAN 340 will comply with predetermined connectivity policies. If it is determined that connectivity to the LAN 340 does not comply with predetermined connectivity policies, then the network connectivity manager 156 discontinues connectivity efforts. Otherwise, location information and corresponding network connectivity information associated with the LAN 340 is captured by the network connectivity manager 156 and saved in mobile device 202. In one embodiment, predetermined network location and connectivity information is automatically collected from the LAN 340 and saved by the network connectivity manager. In another embodiment, the predetermined network location and connectivity information is manually entered by the mobile device user 204 into the network connectivity manager 156. In yet another embodiment, the network connectivity manager 156 saves the collected network location and connectivity information external to the mobile device 202, such as through a USB or Bluetooth connection to another device.

Once location and connectivity information has been collected and saved, the network connectivity manager 156 determines whether connectivity to LAN 340 requires the provision of user credentials. If user credentials are required, then the network connectivity manager 156 determines whether the required user credentials are available. If user credentials are available, then they are retrieved by the network connectivity manager 156 and submitted to the LAN 340. For example, in once embodiment a user ID and password is securely stored in the mobile device 202. In another embodiment, user credentials are securely stored in a subscriber information module (SIM) which is contained within the mobile device 202. In yet another embodiment, the mobile device 202 initiates a separate network connection, such as through a Bluetooth connection, to retrieve user credentials from another device or from a network host. Many such embodiments are possible and the examples given herein are not exhaustive. If it is determined by the network connectivity manager 156 that user credentials are not available, then they are created by the mobile device user 204 and submitted to the LAN 340. After the user credentials are accepted by the LAN 340, the network connectivity manager 156 then saves them on the mobile device 202 for later reuse.

Once the user credentials are submitted and network connectivity has been successfully achieved, the network connectivity manager 156 determines whether a virtual private network (VPN) connection is required. If a VPN connection is required, then the network connectivity manager 156 uses connectivity policies 160, user credentials 162, and location and connectivity information 170 to perform VPN operations known to those of skill in the art. Once the VPN connection is established, then network connectivity information updates are received by the network connectivity manager 156 from the network connectivity management host 306. In various embodiments, network connectivity management host 306 comprises location and network connectivity information repository 308, GPS information repository 310, connectivity policy repository 312, and user credential repository 314.

Once received, these network connectivity information updates are compared by network connectivity manager 156 to network connectivity, network location, and user credential information captured and stored on the mobile device since the last network host update. If it is determined that the captured and stored network connectivity information is more recent than the network host updates, then the network connectivity management host 306 is updated by the network connectivity manager 156. After it is determined that the most current network connectivity information is available, the network connectivity manager 156 then confirms that the network connection to LAN 340 is compliant. If it is not, the network connectivity manager 156 discontinues connectivity efforts with LAN 340. Otherwise a compliant network connection is established and mobile device 202 operations are performed.

FIGS. 4a-d are a generalized flow chart illustrating a network connectivity manager 400 as implemented in accordance with an embodiment of the invention. In this embodiment, management of a mobile device's connectivity to a plurality of networks comprising a plurality of network access locations begins in step 402. In step 404, detection and monitoring operations are performed by the network connectivity manager to determine the network connectivity capabilities of a mobile device. For example, if a mobile device comprises a universal serial bus (USB) port and an embedded Bluetooth transceiver, then the network connectivity manager monitors their operational state. As described in greater detail hereinbelow, if an accessible Bluetooth personal area network (PAN) is detected by the network connectivity manager, then its connectivity availability is monitored. Should the mobile device user signify that network connectivity is desired, then the network connectivity manager connects the mobile device to the Bluetooth PAN. Similarly, if an IEEE 802.11 WiFi adapter is attached to the USB port of the mobile device, then the network connectivity manager detects its presence, and if it is activated, begins detection operations to discover the presence of WiFi network accessibility. If discovered, and should the mobile device user signify that network connectivity is desired, then the network connectivity manager connects the mobile device to the WiFi network.

If it is determined in step 406 that the mobile device is not currently connected to a network, then it is determined in step 414 whether available network connectivity is to be located by the network connectivity manager. If it is determined in step 414 that available network connectivity is not to be located by the network connectivity manager, then the process continues, beginning with step 404. However, if it is determined in step 406 that the mobile device is currently connected to a network, then the network connectivity manager queries a network-based connectivity management host for network connectivity information updates. In various embodiments, the network connectivity information repository further comprises a plurality of predetermined network location information including physical addresses. Likewise, the network connectivity information repository comprises a plurality of predetermined network connectivity information such as communication protocols. Similarly, the network connectivity information repository comprises predetermined network connectivity policies and predetermined mobile device user credentials.

Once network connectivity information updates, including network connectivity policies, are received by the network connectivity manager in step 408, then it is determined in step 410 whether the current network connectivity complies with the most current network connectivity policies. If current network connectivity complies with the most current network connectivity policies, then the process continues, beginning with step 404. If it is determined in step 410 that the current network connectivity does not comply with the most current network connectivity policies, then the mobile device user is alerted in step 412 that network connectivity compliance is not being met. In one embodiment, network connectivity that fails to comply with the current network connectivity policy is automatically discontinued and the network connection is dropped. In another embodiment, the mobile device user is given the option to continue non-compliant network connectivity, or to locate alternative network connectivity that complies with the current network connectivity policy. In yet another example, the network connectivity manager automatically and transparently transfers network connectivity to another network that complies with the current network connectivity policy. As an example, a mobile device may comprise a WLAN modem for WiFi connectivity as well as a WWAN modem for EDGE connectivity. If both WiFi and EDGE connectivity are accessible, a corporate network connectivity policy may state that WiFi connectivity be given precedence due to its higher bandwidth and lower cost.

If it is determined in step 414 that the network connectivity manager is to locate available network connectivity, then the method of network connectivity location is determined in step 416. If it is determined in step 416 to autodetect the presence of a wireless network, then the network connectivity manager performs wireless network autodetection operations in step 418. If it is determined in step 420 that the presence of a wireless network is not detected, then the process continues, beginning with step 416.

Otherwise, it is determined in step 422 whether more than one wireless network connectivity option is detected. If there is, then it is determined in step 424 whether to manually select the wireless network connectivity option. If it is determined in step 424 to not manually select the wireless network connectivity option, then predetermined connectivity policies are used in step 428 to automatically select wireless network connectivity that comply with the policies. Once a wireless network connectivity option is selected, a preliminary network connection is established with the located network by the network connectivity manager in step 482.

However, there are times when the presence of a wireless network cannot be automatically detected, such as when its broadcast beacon has been disabled. In other cases, connectivity to a physical network may be available, but its presence may be neither apparent nor detectable. If this is the case, the network connectivity manager is implemented in different embodiments to query databases that cross-reference network addresses to physical locations.

If it is determined in step 416 to discover the presence of network connectivity by querying a network address-to-location database, then the physical location of the mobile device is first determined in step 463. A determination is then made in step 464 whether the mobile device comprises geographical positioning system (GPS) capabilities. If it does not, then it is determined in step 468 whether the network connectivity manager will query a local network location database. If it is decided in step 468 to not query a local network location database, then the process is repeated, beginning with step 404.

If it is determined in step 464 that the mobile device comprises GPS capabilities, then the network connectivity manager invokes the GPS capabilities in step 466 to establish the mobile device's geographical location. Based on the geographical location of the mobile device, candidate network location information is then retrieved by the network connectivity manager from a local network location database in step 470. The candidate network location information is then filtered by the network connectivity manager in step 472 to eliminate network connectivity options that the mobile device cannot support. Once the network location information has been filtered, it is then determined in step 474 whether local network connectivity has been identified.

If it is determined in step 464 that the mobile device comprises no GPS capabilities, then it is determined in step 468 whether the network connectivity manager will query a local network location database. If so, then candidate network location information is retrieved by the network connectivity manager from a local network location database in step 470. In one embodiment, the network location database is stored within the mobile device. In another embodiment, the network location database is stored external to the mobile device and is accessed through a separate connection, such as through a USB or Bluetooth connection. The candidate network location information is then filtered by the network connectivity manager in step 472 to eliminate network connectivity options that the mobile device cannot support. Once the network location information has been filtered, it is then determined in step 474 whether local network connectivity has been identified.

If it is determined in step 474 that local network connectivity has not been identified by querying a network location database, then it is determined in step 476 whether to manually discover a network connectivity location. If it is decided in step 476 to not discover a network connectivity location by using manual methods, then the process is repeated, beginning with step 404. Otherwise, manual operations to discover network connectivity are performed in step 478. In one embodiment, the mobile device user makes inquiries of other users regarding network access. In another embodiment, the mobile device user calls a help desk to locate possible network connectivity. Many such embodiments are possible and the examples given herein are exemplary and are not meant to be construed as definitive. If it is determined in step 480 that locations for network connectivity can not be located by using manual methods, then the process is repeated, beginning with step 404. However, if manual network connectivity location methods are determined in step 480 to be successful, then a preliminary network connection is established to the manually-located network by the network connectivity manager in step 482.

Regardless of how the network connectivity location was determined, the network connectivity manager detects and collects network connectivity information about the manually-located network in step 484. Comparison operations are then performed on the collected network connectivity information in step 486 to determine whether connectivity to the manually-located network will comply with predetermined connectivity policies. If it is determined in step 488 that connectivity to the located network does not comply with predetermined connectivity policies, then the process is repeated, beginning with step 412.

Otherwise, predetermined location information associated with the located network is captured and saved in step 490 and corresponding predetermined network connectivity information is captured and saved in step 492. In one embodiment, predetermined network location and connectivity information is automatically collected from the located network and saved by the network connectivity manager. In another embodiment, the predetermined network location and connectivity information is manually entered by the mobile device user into the network connectivity manager. In yet another embodiment, the collected network location and connectivity information is saved by the network connectivity manager within the mobile device for later reuse. In still another embodiment, the network connectivity manager saves the collected network location and connectivity information external to the mobile device, such as through a USB or Bluetooth connection to another device.

Once location and connectivity information has been collected and saved, it is then determined in step 430 whether connectivity requires the provision of user credentials. If user credentials are required, then it is determined in step 432 if the required user credentials are available. If user credentials are available, then they are retrieved and submitted in step 434. For example, in one embodiment a user ID and password is securely stored in the mobile device. In another embodiment, user credentials are securely stored in a subscriber information module (SIM) which is contained within the mobile device. In yet another embodiment, the mobile device may initiate a separate network connection, such as through a Bluetooth connection, to retrieve user credentials from another device or from a network host. Many such embodiments are possible and the examples given herein are not exhaustive. If it is determined in step 432 that user credentials are not available, then they are created and submitted in step 436 and then saved on the mobile device for later reuse. Once the user credentials are submitted, the process continues beginning with step 438, where it is determined whether network connectivity has been successfully achieved. If it has not, then the process continues, beginning with step 404.

Otherwise, it is then determined in step 440 whether a virtual private network (VPN) connection is required. If it is, then operations known to those of skill in the art are performed to establish and maintain a VPN connection in step 442. If it is determined in step 444 that the operations to establish and maintain a VPN were unsuccessful, then the process is repeated, beginning with step 404. Otherwise, once the VPN connection is successfully established in step 442, or if it is determined in step 440 that no VPN connection is required, then network connectivity information updates are received from the network connectivity management host in step 446.

Once network connectivity information updates are received in step 446, they are compared in step 448 to network connectivity, network location, and user credential information captured and stored on the mobile device since the last network host update. If it is determined in step 450 that the captured and stored network connectivity information is more recent than the network host updates, then the network connectivity management host is updated by the mobile device's network connectivity manager in step 452.

After it has been determined in steps 446, 448 and 450 that the most current location and network connectivity information is available, the network connectivity manager determines in step 454 whether the current network connection is compliant. If it is not, the process is repeated, beginning with step 404. Otherwise a compliant network connection is established and maintained in step 456 and mobile device operations are performed in step 458. If it is determined in step 460 that the network connection is active, then the process is repeated, beginning with step 456. Otherwise, it is determined in step 462 whether to discontinue network connectivity management. If it is not, then the process repeats itself beginning with step 404. Otherwise, network connectivity management is discontinued in step 494.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for managing the connectivity of a mobile device to a plurality of network connectivity locations, comprising:
   a processor operable to process network connectivity management information;
   a repository of said network connectivity management information comprising network location information, network connectivity information, and a plurality of network connectivity policies; and
   a network connectivity manager operable to:
      detect an available network;
      use said network location information to determine the location of said network and the location of said mobile device; and
      use said network location information to manage the connectivity of said mobile device to said network.

2. The system of claim 1, wherein said repository of network connectivity management information further comprises a plurality of predetermined mobile device user credentials.

3. The system of claim 1, wherein said network connectivity manager is further operable to use said network connectivity management information to manage the connectivity of said mobile device during transition from a first network to a second network.

4. The system of claim 1, wherein said at least one mobile device is physically connected to said plurality of networks.

5. The system of claim 1, wherein said at least one mobile device is wirelessly connected to said plurality of networks.

6. The system of claim 1, wherein said at least one mobile device is physically and wirelessly connected to said plurality of networks.

7. The system of claim 1, wherein said repository of network connectivity management information is stored on a network host.

8. The system of claim 7, wherein said network host is operable to receive network connectivity management information from a plurality of sources.

9. The system of claim 8, wherein said network host receives said network connectivity management information from said network connectivity manager, wherein said network connectivity management information is automatically collected by said network connectivity manager.

10. The system of claim 8, wherein said network host receives said network connectivity management information from said network connectivity manager, wherein said network connectivity management information is manually entered into said network connectivity manager by a user of said at least one mobile device.

11. The system of claim 7, wherein said network host is operable to provide at least one predetermined subset of said network connectivity management information to said at least one mobile device.

12. The system of claim 1, wherein said predetermined network location information comprises geographical location information operable to be used by said network connectivity manager for coupling of said at least one mobile device to a predetermined network.

13. The system of claim 12, wherein said geographical location information comprises geographical positioning system (GPS) information.

14. The system of claim 1, wherein said predetermined network connectivity information comprises network address information.

15. The system of claim 1, wherein said predetermined network connectivity information comprises network protocol information.

16. The system of claim 1, wherein said predetermined connectivity policies comprise network security parameters.

17. The system of claim 16, wherein said network security parameters comprise virtual private network (VPN) information, wherein said VPN information is used by said network connectivity manager to generate a VPN network connection.

18. The system of claim 1, wherein said predetermined connectivity policies comprise quality of service (QOS) parameters.

19. The system of claim 1, wherein said predetermined connectivity policies comprise network connectivity cost parameters.

20. The system of claim 1, wherein said predetermined mobile device user credentials comprise mobile device user authentication information.

21. The system of claim 20, wherein said mobile device user authentication information is cryptographically secured.

22. The system of claim 1, wherein said network connectivity manager is operable to determine the presence of a wireless network by detecting a wireless network signal.

23. The system of claim 1, wherein said network connectivity manager is operable to use said network connectivity management information to autonomously transfer said connectivity of said at least one mobile device from said first network to said second network.

24. A computer-implementable method for managing the connectivity of a mobile device to a plurality of network connectivity locations, comprising processing logic used for:
  accessing a repository of network connectivity management information comprising network location information, network connectivity information, and a plurality of network connectivity policies; and
    a plurality of predetermined mobile device user credentials; and
  using a network connectivity manager to:
    detect an available network;
    use said network location information to determine the location of said network and the location of said mobile device; and
    use said network location information to manage the connectivity of said mobile device to said network.

25. The method of claim 24, wherein said repository of network connectivity management information further comprises a plurality of predetermined mobile device user credentials.

26. The method of claim 24, further comprising: using said network connectivity management information to manage the connectivity of said mobile device during transition from a first network to a second network.

27. The method of claim 26, wherein said at least one mobile device is operable to be physically connected to said plurality of networks.

28. The method of claim 26, wherein said at least one mobile device is operable to be wirelessly connected to said plurality of networks.

29. The method of claim 26, wherein said at least one mobile device is operable to be connected physically and wirelessly to said plurality of networks.

30. The method of claim 26, wherein said repository of network connectivity management information is stored on a network host.

31. The method of claim 30, wherein said network host is operable to receive network connectivity management information from a plurality of sources.

32. The method of claim 31, wherein said network host receives said network connectivity management information from said network connectivity manager, wherein said network connectivity management information is automatically collected by said network connectivity manager.

33. The method of claim 31, wherein said network host receives said network connectivity management information from said network connectivity manager, wherein said network connectivity management information is manually entered into said network connectivity manager by a user of said at least one mobile device.

34. The method of claim 30, wherein said network host is operable to provide at least one predetermined subset of said network connectivity management information to said at least one mobile device.

35. The method of claim 24, wherein said predetermined network location information comprises geographical location information operable to be used by said network connectivity manager for coupling of said at least one mobile device to a predetermined network.

36. The method of claim 35, wherein said geographical location information comprises geographical positioning system (GPS) information.

37. The method of claim 24, wherein said predetermined network connectivity information comprises network address information.

38. The method of claim 24, wherein said predetermined network connectivity information comprises network protocol information.

39. The method of claim 24, wherein said predetermined connectivity policies comprise network security parameters.

40. The method of claim 39, wherein said network security parameters comprise virtual private network (VPN) information, wherein said VPN information is used by said network connectivity manager to generate a VPN network connection.

41. The method of claim 24, wherein said predetermined connectivity policies comprise quality of service (QOS) parameters.

42. The method of claim 24, wherein said predetermined connectivity policies comprise network connectivity cost parameters.

43. The method of claim 24, wherein said predetermined mobile device user credentials comprise mobile device user authentication information.

44. The method of claim 43, wherein said mobile device user authentication information is cryptographically secured.

45. The method of claim 24, wherein said network connectivity manager is operable to determine the presence of a wireless network by detecting a wireless network signal.

46. The method of claim 24, wherein said network connectivity manager is operable to use said network connectivity management information to autonomously transfer said connectivity of said at least one mobile device from said first network to said second network.

* * * * *